United States Patent [19]
Bailey

[11] Patent Number: 5,410,255
[45] Date of Patent: Apr. 25, 1995

[54] METHOD AND APPARATUS FOR DETECTING AND DISTINGUISHING LEAKS USING REFLECTOMETRY AND CONDUCTIVITY TESTS

[75] Inventor: Douglas S. Bailey, Deerfield, Ill.

[73] Assignee: Perma-Pipe, Inc., Niles, Ill.

[21] Appl. No.: 57,808

[22] Filed: May 7, 1993

[51] Int. Cl.⁶ ............................................. G01R 31/11
[52] U.S. Cl. .................... 324/525; 324/533; 324/534; 174/11 R; 340/605
[58] Field of Search .................. 73/40.5 R; 174/11 R; 324/525, 533, 534, 541, 544, 555; 340/605

[56] References Cited

U.S. PATENT DOCUMENTS

| | | | |
|---|---|---|---|
| 3,981,181 | 9/1976 | Ochiai | 73/40.5 R |
| 4,206,632 | 6/1980 | Suzuki | 73/40.5 R |
| 4,797,621 | 1/1989 | Anderson et al. | 324/533 |
| 4,877,923 | 10/1989 | Sahakian | 73/40.5 R |
| 4,926,129 | 5/1990 | Wasley et al. | 324/525 |
| 4,926,165 | 5/1990 | Lahlouh et al. | 340/603 |
| 5,015,958 | 5/1991 | Masia et al. | 324/522 |
| 5,134,377 | 7/1992 | Reddy, III et al. | 324/533 |
| 5,159,276 | 10/1992 | Reddy, III | 324/539 |
| 5,177,996 | 1/1993 | Sahakian | 324/533 |
| 5,235,286 | 8/1993 | Masia et al. | 324/522 |

*Primary Examiner*—Kenneth A. Wieder
*Assistant Examiner*—Christopher M. Tobin
*Attorney, Agent, or Firm*—Fitch, Even, Tabin & Flannery

[57] ABSTRACT

A method and apparatus for detecting and locating fluid leaks, particularly liquid leaks, and determining whether the leaking liquid being detected is a non-conductive liquid such as a hydrocarbon or a conductive liquid such as water utilizes a composite detection cable having a pair of insulated conductors and a pair of uninsulated conductors. Pulses are applied to the insulated conductors and leaks are detected and located utilizing time domain reflectometry (TDR) techniques. The resistance between the uninsulated conductors is measured to determine whether or not the leak is conductive.

14 Claims, 4 Drawing Sheets

Microfiche Appendix Included
(1 Microfiche, 19 Pages)

METHOD AND APPARATUS FOR DETECTING AND DISTINGUISHING LEAKS USING REFLECTOMETRY AND CONDUCTIVITY TESTS

CROSS REFERENCE TO RELATED APPLICATION

This application is related to U.S. patent application Ser. No. 08/056,062, now U.S. Pat. No. 5,355,720 a continuation-in-part of Ser. No. 07/893,499, filed on Jun. 4, 1992, now abandoned, entitled "CORROSION RESISTANT CABLE" filed May 7, 1993 by the same inventor as the named inventor of the present application.

MICROFICHE APPENDIX

A microfiche Appendix I consisting of one (1) microfiche having nineteen (19) frames, is provided that includes the material incorporated by reference to the now-abandoned U.S. patent application Ser. No. 07/926,305.

BACKGROUND OF THE INVENTION

1. Field of the Invention

This invention relates generally to leak detection systems that employ a liquid or other fluid permeable leak detection cable to determine the occurrence and location of a leak in an area being monitored.

2. Description of the Prior Art

Various leak detection systems are known. Among such system are time domain reflectometry (TDR) systems such as, for example, the system disclosed in U.S. Pat. No. 4,797,621, incorporated herein by reference. In such time domain reflectometry systems, a pulse is sent down a transmission line and the reflected pulses are monitored. A change in the time of arrival or the shape of a reflected pulse indicates a leak and the location of the leak along the cable. Other systems utilize resistive cables whose resistance is measured and provides an indication of the location of a leak. Examples of such a systems are illustrated in U.S. Pat. Nos. 4,926,165 and 5,015,958. While the above-identified systems provide a way to detect and locate leaks, neither system can differentiate between non-conductive and conductive leaks.

In an attempt to distinguish between conductive and non-conductive leaks, systems utilizing separate cables and separate monitoring stations monitoring each of the cables have been installed. In such a system a cable that allows only hydrocarbons to penetrate is used in conjunction with a cable that allows both hydrocarbons and water to penetrate in a time domain reflectometry system. The TDR system can then be used to determine whether a leak is conductive or non-conductive based on whether one or both cables have been penetrated.

While these systems do provide a way to detect leaks and in some cases differentiate between conductive and non-conductive leaks, these system are relatively complicated and in many instances only have limited range.

SUMMARY

Accordingly, it is an object of the present invention to provide a system for detecting, locating and distinguishing leaks that overcomes many of the disadvantages of the prior art systems.

It is another object of the present invention to provide a system for detecting, locating and distinguishing leaks that utilizes a composite cable having insulated and uninsulated conductors for detecting and locating leaks and determining whether tile leaks are conductive or nonconductive.

It is another object of the present invention to provide a monitoring station for the composite cable that applies pulses to the insulated conductors to detect and locate leaks utilizing time domain reflectometry and measures the resistance of the uninsulated cables to determine whether the leak is conductive or non-conductive.

In accordance with a preferred embodiment of the invention, there is provided a leak detecting cable having insulated and uninsulated conductors disposed in a spaced parallel relationship and an insulated liquid permeable medium disposed therebetween. A pulse generator and a resistance measuring device are electrically coupled to the insulated and uninsulated conductors, respectively. A control system causes the pulse generator to send pulses down the line until a leak is detected and located using time domain reflectometry techniques. When a leak is detected, the control system causes a voltage or a current to be applied to the uninsulated conductors in order to measure the resistance of the uninsulated conductors. The measured resistance is compared with a reference resistance value, and if the measured resistance is substantially the same as the reference resistance value, the leak is non-conductive. If the measured resistance value is below the reference resistance, the leak is conductive. While the system described in the present application is described as a leak detecting device, it should be understood that the system is capable of detecting any fluid whether it be a leak or a fluid level.

BRIEF DESCRIPTION OF THE DRAWING

These and other objects and advantages of the present invention shall become readily apparent upon consideration of the following detailed description and attached drawing, wherein.

DETAILED DESCRIPTION OF THE PREFERRED EMBODIMENT

Figure 1:
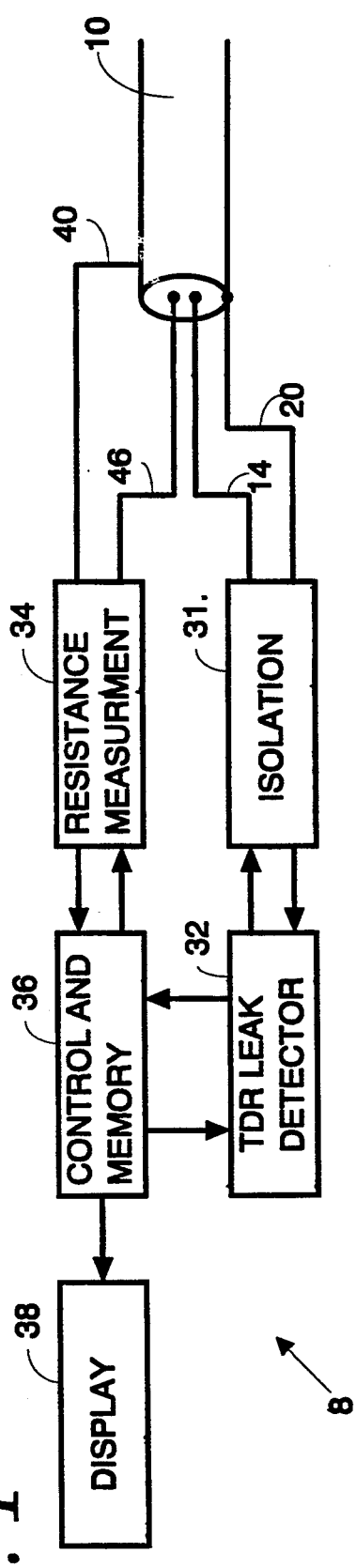
FIG. 1 is a block diagram of the leak detecting and distinguishing system according to the present invention.

Referring now the drawing, with particular attention to FIG. 1, there is illustrated a preferred embodiment of the system for detecting the presence of fluids and distinguishing between conductive and non-conductive fluids according to the invention generally designated by the reference numeral 8. The system according to the invention preferably utilizes a fluid detecting cable 10 having a pair of conductors 14 and 46 and a pair of outer conductors 20 and 40 forming a shield. One of the central conductors 14 is insulated, while the conductor 46 is not. Also, one of the outer conductor 40 is not insulated while the others are. A specific embodiment of the cable 10 will be discussed in conjunction with FIG. 2 below.

An isolation circuit 31 is connected to a pair insulated conductors 14 and 20 of the cable 10 and couples pulses from a time domain reflectometry (TDR) leak detector 32 to the insulated conductors of the cable 10 and returns reflections from the cable 10 to the time domain reflectometry leak detector 32. An example of a time domain reflectometry leak detector particularly useable with the present invention is the one disclosed in the previously mentioned U.S. Pat. No. 4,797,621, incorporated herein by reference. A resistance measuring device 34 is connected to a pair of uninsulated wires 40 and 46 inside the cable 10. The resistance measuring device 34 measures the resistance between the uninsulated wires 40 and 46 upon receiving an appropriate signal from a control and memory circuit 36. The control and memory circuit receives signals from the resistance measuring circuit 34 and from the TDR leak detector 32 and stores the results in a memory as reference values and for display on a display 38 when a leak is detected. Normally, the reference resistance between the conductors will be relatively high for a dry cable. Also, although FIG. 1 shows four separate wires connected to the resistance measuring circuitry and the TDR circuitry, in practice, the conductors 14 and 16 and the conductors 20 and 40 would most likely be connected together at the connector connecting the cable 10 to the measurement circuitry and the cable switched between the TDR circuitry and the resistance measuring circuitry depending on the measurement desired.

Figure 3:
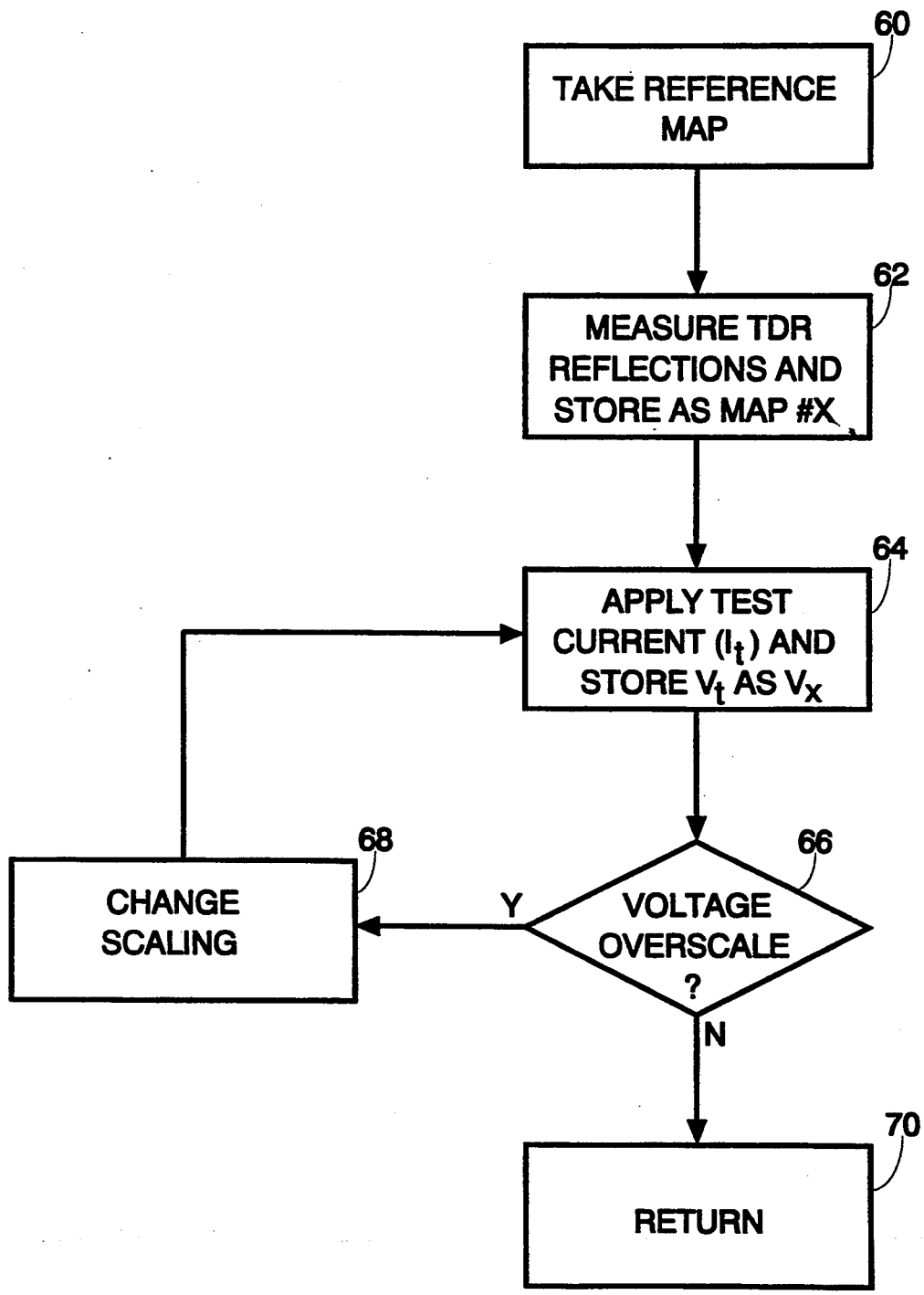
FIG. 3 is a flow chart illustrating the self-calibration aspect of the system according to the invention.
Figure 4:
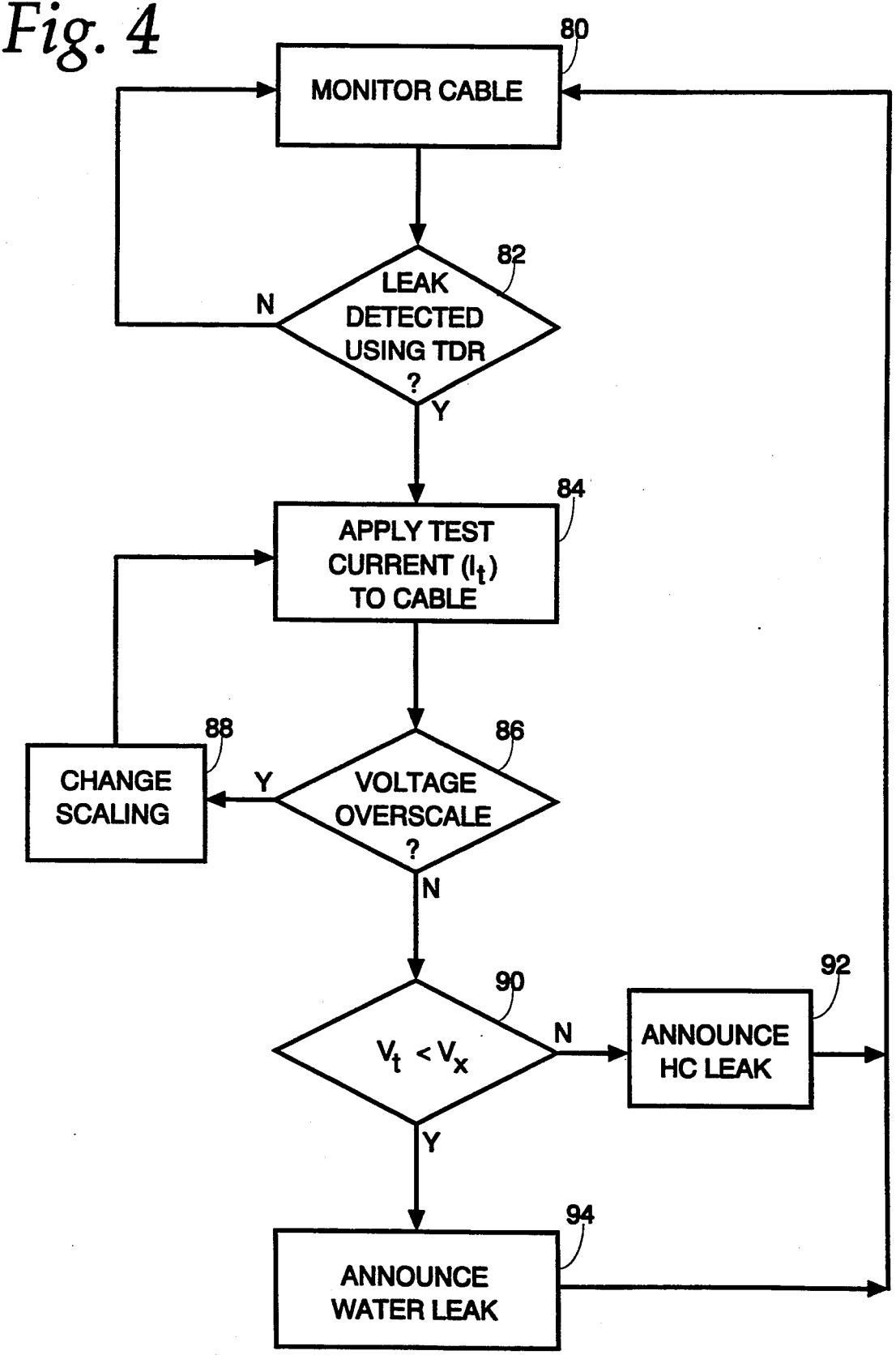
FIG. 4 is a flow chart illustrating the operation of the system according to the invention.

Alternatively, the system may be configured to apply either pulses to the connected wires for TDR measurements or a constant voltage, constant current or fixed charge for resistance measurements may be selectively applied to the conductors, preferably under the control of a microprocessor, in order to eliminate the need for switching functions, as is illustrated in FIGS. 3 and 4. Also, a single uninsulated conductor can be used as the central conductor instead of the conductors 14 and 46, or the two central conductors retained and the outer conductor can be made entirely uninsulated.

Figure 2:
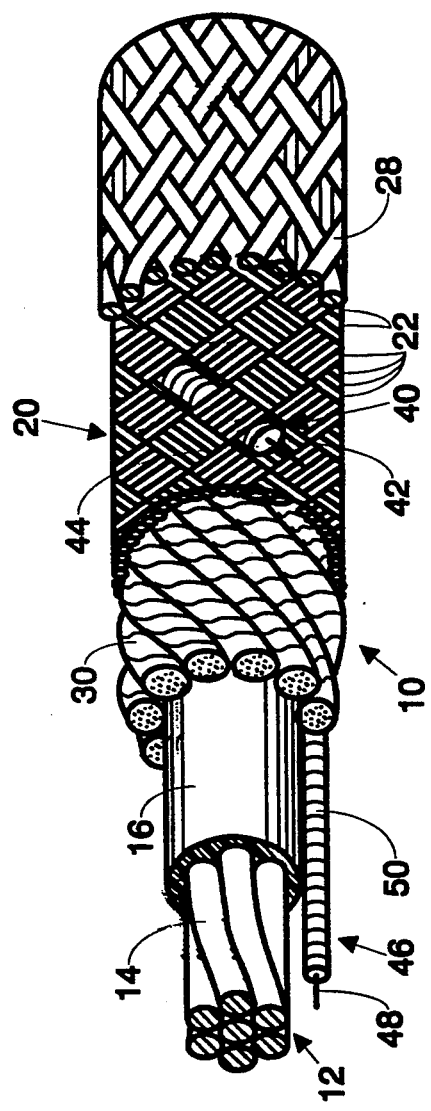
FIG. 2 is a cutaway perspective view of a leak detecting cable usable in conjunction with the present invention.

Referring to FIG. 2, there is shown one embodiment of the cable 10 in greater detail. The cable 10 is capable of differentiating between leaks of a non-conductive fluid, such as a liquid hydrocarbon, and conductive fluids, such as water. The cable illustrated in FIG. 2 has a braided sheath 20 formed by a plurality of insulated wires 22 and an uninsulated wire 40 having a central conductor 42 and a protective covering 44. The central conductor 42 has a heavier wire gauge than the gauge of the individual insulated wires. The gauge of the wire 42 may be on the order of 30 gauge, but the gauge will vary depending on the size of the cable. The protective covering 44 is an electrically conductive covering which may be polymer coating impregnated with carbon or graphite extruded about the central conductor 42. An additional wire 46 is placed parallel to the central conductor 12. The wire 46 has a central conductor 48 similar to the central conductor 42, and a protective covering 50 similar to the protective covering 44. Alternatively, the wires 42 and 48 can be fabricated from a non-corrosive material such as stainless steel, thereby eliminating the need for the protective coverings 44 and 50. In addition, the central conductor can be eliminated if the central conductor 14 is uncovered or covered by a conductive covering such as the covering 44 or 50. In such a cable, the resistance measurement would be made between the wire 40 and the central conductor 14.

The cable of FIG. 2 permits the system to discriminate between electrically non-conductive leaks such as liquid hydrocarbon leaks and electrically conductive leaks such as water leaks. The discrimination is accomplished by electrically connecting the central conductor 48 of the wire 46 to the central conductor 14 of the wire 12 at each end of the cable and by connecting the central conductor 42 to the braid 20 at each end of the cable. The resistance between the conductors 42 and 48 at the sensing end of the cable is measured when no leak is present and that value is stored.

While monitoring the cable for leaks, electrical pulses are applied between the braid 20 and the central conductor 14 to detect leaks utilizing time domain reflectometry as previously discussed. When a leak is detected utilizing time domain reflectometry, the resistance between the central conductors 42 and 48 is measured. If there is no change in resistance or only a minimal change, the leak is a non-conductive fluid, such as a hydrocarbon. If there is a substantial change, then the leak is a conductive fluid, such as water. Thus, the cable illustrated in FIG. 2 is capable of not only detecting and locating a leak, but also of determining whether the leak is electrically conductive or non-conductive.

Other examples of cables suitable for the cable 10 are disclosed in the aforementioned U.S. patent application Ser. No. 08/056,062, now U.S. Pat. No. 5,355,720 entitled "CORROSION RESISTANT CABLE", incorporated herein by reference.

Referring now to FIG. 3, the TDR system is first calibrated by taking a reference map by blocks 60 and 62 in a manner similar to that disclosed in U.S. Pat. No. 4,797,621. The map thus taken is stored in memory as a reference map for subsequent comparisons. After the reference TDR map has been stored, an initial resistance measurement is made by applying a test current to the uninsulated conductors and measuring the voltage which is a function of the resistance and the current applied as shown in block 64. A voltage overscale block 66 then determines whether the voltage resulting from the test current is excessive and, if so, a change scaling block 68 adjusts the test current and another test current is applied to the system. If the voltage is now within the dynamic range of the system, the system stores the measured voltage $V_T$ as a reference voltage $V_X$, returns to the monitor cable block of FIG. 4 as illustrated by block 70, and the system is now ready to monitor the cable for leaks.

Although a constant current source was used in conjunction with a voltage measuring device to measure resistance, the resistance measurement can be accomplished in various known ways, for example, by applying a constant voltage and measuring current. Also, a variable voltage could be applied to the cable and adjusted until a predetermined current is obtained. Conversely, a variable current may be applied to the cable and varied until a predetermined voltage is obtained. The value of the applied voltage or current necessary to obtain the predetermined current or voltage would provide a measure of the cable resistance. A fixed charge method that applies a voltage or a current to the uninsulated pair for a predetermined time period may also be used. In such a system, the voltage or current is removed at the end of the predetermined time period and after a preset time period following the removal of the voltage or current, a voltage reading across the cable is taken. Because a dry cable holds a charge longer than a wet cable, the voltage provides an indication of whether the cable is wet or dry. The voltage levels of a dry cable and for other cable conditions may be saved and used as reference values.

Time domain reflectometry techniques other than those disclosed in U.S. Pat. No. 4,797,621 can also be used. Examples of such techniques are real time digitizing techniques, techniques that use fixed thresholds, the system disclosed in U.S. Pat. No. 5,134,377 or the technique disclosed in U.S. patent application Ser. No. 07/926,305, filed Aug. 10, 1992, (by the same inventor as the named inventor in the present application and) incorporated herein by reference as MICROFICHE appendix.

After the system has been calibrated, the monitor cable function is initiated by the block 80 to determine whether a leak has been detected using TDR as shown in block 82. If no leak has been detected, the cable monitoring function continues. If a leak has been detected by the TDR system, a test current $I_T$ is applied to the cable under the control of a block 84. A determination is made by a block 86 as to whether the output voltage from the cable as a result of the applied current is overscale. If it is, the scale is changed as illustrated by a block 88 and a new test current is applied to the cable. If the resulting voltage from the cable is not overscale, the voltage from the cable $V_T$ is compared with the stored reference voltage $V_X$ as illustrated by a block 90. If the test voltage $V_T$ from the cable is not less than the stored reference voltage $V_X$, thus indicating no change in resistance, a block 92 directs the display 48 to announce a hydrocarbon leak and the cable monitoring resumes. If the test voltage from the cable $V_T$ is less than the reference voltage $V_X$ indicating a drop in resistance, the block 94 causes the display 48 to announce a water leak.

Figure 5:
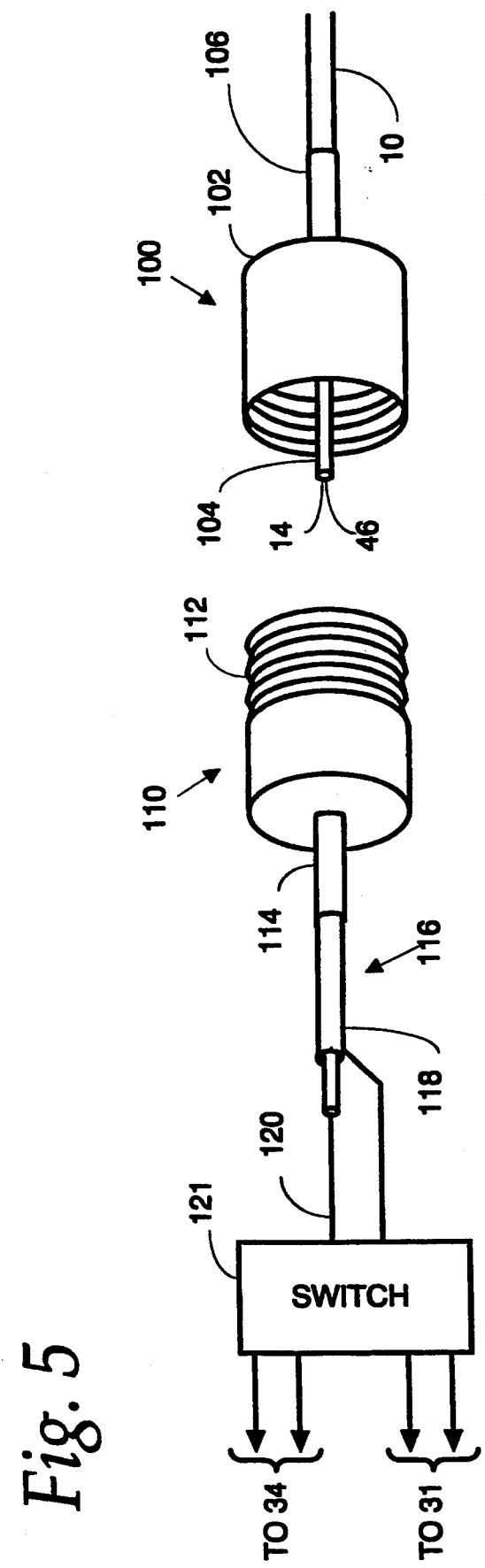
FIG. 5 shows a practical way to connect the leak detecting cable to the detection circuitry.

Although FIG. 1 shows the insulated conductors 14 and 20 separated from the uninsulated conductors 40 and 46, the conductors 14 and 46 may be connected together at one end or both ends of the cable and the conductors 20 and 40 may also be connected together at one end or both ends of the cable as previously discussed in conjunction with FIG. 1. When a coaxial cable is used, the connection between the conductors can conveniently be made by connectors that terminate the cable. As is illustrated in FIG. 5, the cable 10 is terminated by a male connector 100 that has an outer conductor 102 that may take the form of a threaded collar and a central conductor 104 that may take the form of a hollow pin. A crimping collar 106 protrudes from the back of the connector 100 and receives and retains the conductor 10.

When a connector such as the connector 100 is used, the insulation is stripped from the end of the conductor 14, and the conductor 14 and the uninsulated conductor 46 are inserted into the hollow pin 104. After the conductors 14 and 46 have been inserted, they are retained within the pin 104 and electrically connected to each other and to the pin 104, for example, by soldering. The insulated and uninsulated conductors 20 and 40 (not shown in FIG. 5) that form the shield of the cable 10 are retained within the rearwardly extending crimping collar 106, for example, when the crimping collar is crimped. The crimping collar 106 also provides an electrical connection between the conductors 20 and 40 and the collar 102.

The connector 100 is plugged into a mating conductor 110 that has a cylindrical outer portion 112 which may be threaded to receive the threads of the collar 102 and another crimping collar 114 that may be crimped to receive a cable 116 which can be a coaxial cable having an outer shield 118 and a central conductor 120. The cable 116 can be connected to a switching circuit 120 that selectively connects the cable 116 and, consequently, the cable 10 to either the TDR circuitry via the isolation circuit 31 or to the resistance measuring circuitry 34 of FIG. 1. The switch, such as the switch 120, can be an electronic switch or an electromechanical switch such as a relay that can be selectively energized to apply either pulses to the cable for TDR measurements or a constant current, constant voltage or other fixed quantity such as charge to measure resistance as illustrated by the flow charts of FIGS. 3 and 4.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the U.S. is:

1. Apparatus for detecting and locating fluid and determining whether or not the fluid is conductive, comprising:
   a fluid detecting cable having an insulated conductor and uninsulated conductors, each of said conductors being disposed in a spaced apart relationship by a liquid permeable medium;
   means utilizing reflectometry techniques for applying pulses to said insulated conductor for detecting and locating the presence of fluids in response to reflected pulses;
   means electrically coupled to said uninsulated conductors for measuring the resistance between two uninsulated conductors and comparing the measured resistance to a reference value; and
   means responsive to said pulse applying means and to said resistance measuring means for providing an indication that the fluid is non-conductive if the presence of a fluid has been detected by the pulse applying means and the resistance between said uninsulated conductors has not changed substantially from the reference value and for providing an indication that the fluid is conductive if the resistance between said uninsulated conductors has changed substantially from the reference value.

2. Apparatus as recited in claim 1, wherein said cable is a coaxial cable having an uninsulated central conductor and a shield fabricated from insulated and uninsulated conductors.

3. Apparatus as recited in claim 2, wherein said insulated and uninsulated conductors forming said shield are electrically connected together at one end of said cable.

4. Apparatus as recited in claim 3, further including means for selectively coupling said connected together cables to said pulse applying means and said resistance measuring means.

5. Apparatus as recited in claim 1, wherein said resistance measuring means includes means responsive to the resistance between said uninsulated cables under predetermined conditions and storing said reference value in response thereto.

6. Apparatus for detecting and locating the presence of a fluid and determining whether or not the fluid is conductive, comprising:

a fluid detecting cable having first and second insulated conductors and first and second uninsulated conductors, each of said conductors being disposed in a spaced apart relationship by a fluid permeable medium;

means utilizing reflectometry techniques for applying pulses to the insulated conductors for detecting and locating the presence of fluids in response to reflected pulses;

means electrically coupled to said uninsulated conductors for measuring the resistance between said uninsulated conductors and comparing the measured resistance to a reference value; and means responsive to said pulse applying means and to said resistance measuring means for providing an indication that the fluid is non-conductive if the presence of a fluid has been detected by the pulse applying means and the resistance between said uninsulated conductors has not changed substantially from the reference value and for providing an indication that the fluid is conductive if the resistance between said uninsulated conductors has changed substantially from the reference value.

7. Apparatus as recited in claim 6, wherein said cable is a coaxial cable having an uninsulated central conductor, an insulated central conductor and a shield being fabricated from insulated and uninsulated conductors.

8. Apparatus as recited in claim 7, wherein said insulated and uninsulated conductors forming said shield are electrically connected together and said central conductors are electrically connected together.

9. Apparatus as recited in claim 8, wherein said connected together conductors are connected at an end of said cable.

10. Apparatus as recited in claim 9, wherein said apparatus has a connector connected to said end of said cable, said connector being operative to connect said central conductors together and to connect said insulated and uninsulated conductors forming said shield together.

11. Apparatus as recited in claim 8, further including means for selectively coupling said connected together cables to said pulse applying means and said resistance measuring means.

12. Apparatus as recited in claim 6, wherein said resistance measuring means includes means responsive to the resistance between said uninsulated cables under predetermined conditions and storing said reference value in response thereto.

13. A method for detecting and locating the presence of a fluid and determining whether or not the fluid is conductive, comprising:

providing a fluid detecting cable having an insulated conductor and uninsulated conductors, each of said conductors being disposed in a spaced apart relationship by a fluid permeable medium;

utilizing reflectometry techniques for applying pulses to said insulated conductor and detecting and locating the presence of fluid in response to reflected pulses;

measuring the resistance between two uninsulated conductors and comparing the measured resistance to a reference value; and if a fluid has been detected utilizing the reflectometry techniques, providing an indication that the fluid is non-conductive if the resistance between said uninsulated conductors has not changed substantially from the reference value and providing an indication that the fluid is conductive if the resistance between said uninsulated conductors has changed substantially from the reference value.

14. A method for detecting and locating a leak and determining whether or not the leak is conductive, comprising:

providing a leak detecting cable having first and second insulated conductors and first and second uninsulated conductors, each of said conductors being disposed in a spaced apart relationship by a liquid permeable medium;

utilizing reflectometry techniques for applying pulses between the insulated conductors and detecting and locating leaks in response to reflected pulses;

measuring the resistance between said uninsulated conductors and comparing the measured resistance to a reference value; and if a leak has been detected utilizing the reflectometry techniques, providing an indication that the leak is non-conductive if the resistance between said uninsulated conductors has not changed substantially from the reference value and providing an indication that the leak is conductive if the resistance between said uninsulated conductors has changed substantially from the reference value.

* * * * *